United States Patent [19]
Pavlov et al.

[11] 3,744,279
[45] July 10, 1973

[54] PELT FLESHING MACHINE

[76] Inventors: Jury Vasilievich Pavlov, Ramensky raion, Rodniki, Trudovaya ulitsa, 12; Alexandr Alexeevich Petrov, Ramensky raion Rodniki, ulitsa B. Uchitelskaya, 9 kv. 55, both of Moskovskaya oblast; Viktor Alexandrovich Nikolsky, ulitsa Fabrichnaya, 21, kv. 12, Ramenskoe Moskovskoi oblasti; Raisa Ivanovna Chunyaeva, Ljuberetski raion, poselok Malakhovka, ultisa Schorsa, 21, Moskovskaya oblast, all of U.S.S.R.; Leonid Alexandrovich Filin, deceased, late of ulitsa, Zheleznodorozhnaya,, Krasnogorsk, U.S.S.R. by Svetlana Ivanovna Bulaeva, administrator

[22] Filed: Feb. 24, 1972

[21] Appl. No.: 228,886

[30] Foreign Application Priority Data
Mar. 2, 1971  U.S.S.R. ............................. 1622318

[52] U.S. Cl. ................................................. 69/46
[51] Int. Cl. ............................................. C14b 1/02
[58] Field of Search .................... 69/46, 20, 37, 40, 69/42

[56] References Cited
UNITED STATES PATENTS

| 2,455,505 | 12/1948 | Lamy ..................................... 69/20 |
| 2,941,391 | 6/1960 | Henfling ................................ 69/46 |
| 2,942,448 | 6/1960 | Jonas .................................... 69/46 |
| 3,048,995 | 8/1962 | Browning .............................. 69/46 |
| 3,049,906 | 8/1962 | Mills ..................................... 69/46 |

Primary Examiner—Alfred R. Guest
Attorney—Holman & Stern

[57] ABSTRACT

A pelt fleshing machine is disclosed which is used in preliminary processing of peltries.

The device comprises an axially rotatable conical pelt holder installed in frame supports and a carriage with an electric motor whose output shaft mounts a cutting tool whose cutters are formed by tensioned strings. The electric motor with the cutting tool is installed on the carriage with a provision for turning relative to the holder so that the latter turns around its axis due to interaction of the string with the pelt.

2 Claims, 2 Drawing Figures

PATENTED JUL 10 1973 3,744,279

PELT FLESHING MACHINE

BACKGROUND OF THE INVENTION

The present invention relates to devices for removing remaining flesh and fat from the pelts or minks, foxes, polar fixes and sables as well as the skins of other animals during preliminary processing of peltries and can be widely used both in fur breeding and hunting.

Known in the art nowadays is a pelt fleshing machine (see, for example, U.S. Pat. No. 3,048,995, Cl. 69–46).

This device comprises an axially rotatable conical pelt holder installed in frame supports, and a carriage moving over the frame guides along the skin holder and carrying an electric motor and a cutting tool whose cutters intended to remove fat and remaining flesh are made in the form of tensioned strings.

While fat is being removed from the pelt pulled over the holder, the latter is rotated by an electric drive. In this case the holder rotates at a constant angular speed so that the peripheral speed of the pelt grows while the carriage with the cutting tool moves from the thinner end of the holder towards its thicker end; at a constant speed of the cutting tool relative to the holder and a constant rotation speed of the cutting tool this leaves non-defatted surfaces on the pelt. To eliminate these defects, it is necessary to slow down the carriage while it moves from the thinner end of the holder to its thicker end. In so doing, it is not always possible to determine the required speed of the carriage with the result that, at high speed, non-defatted surfaces are left on the pelt while at low speed the pelt may get damaged.

In other known devices, when the holder is rotated by hand it is necessary, after each pass of the cutting tool along the holder, to turn the latter through a certain angle around its axis and the operator must take care not to leave non-defatted surfaces or strips. Besides, the necessity to make many passes along the pelt holder tires the operator and cuts down labor efficiency.

SUMMARY OF THE INVENTION

An object of the present invention is to provide a pelt fleshing machine wherein the skin holder is rotated around its axis at a constant peripheral speed at the point of contact between the string and the pelt which improves the standard of pelt defatting and steps up labor efficiency.

In accordance with these and other objects we hereby provide a pelt flashing machine comprising an axially rotatable conical skin holder installed in frame supports and a carriage moving over the frame guides along the pelt holder and carrying an electric motor and a cutting tool whose cutters intended to remove fat and remaining meat are made in the form of tensioned strings in which, according to the invention, the cutting tool is mounted on the output shaft of the electric motor which is installed on the carriage with a provision for turning relative to the holder so that it forms such an acute angle between the holder generatrix and the string contacting the pelt at which the component of the cutting force directed trangentially to the holder generatrix rotates the holder.

For turning the electric motor with the cutting tool it is practicable, that the carriage should be provided with a ring mounted on journals in the carriage, the ring carrying the electric motor also mounted on journals, and that the ring should be fitted with a retainer which holds the motor with the cutting tool in the turned position.

Owing to the fact that the cutting tool and electric motor are mounted on the carriage with a provision for turning relative to the holder, there appears a changeable acute angle between the holder generatrix and the string contacting the pelt. The component of the cutting force directed tangentially to the holder generatrix rotates the holder at a constant peripheral speed at the point of contact between the cutting tool and the pelt. The rotation speed of the holder depends on the angle of cutting tool inclination to the holder. The larger this angle, the higher the rotating speed of the holder.

Owing to such an accomplishment of the object of the invention, the holder is rotated by the cutting tool so that it becomes possible to dispense with the additional holder drives. A constant peripheral speed of the pelt at the point of contact with the string rules out incomplete defatting which ensures a high standard of fleshing and a high output. The pelt is processed in one pass.

BRIEF DESCRIPTION OF THE DRAWINGS

Now the invention will be described in detail by way of example with reference to the accompanying drawings, in which.

DETAILED DESCRIPTION OF A PREFERRED EMBODIMENT

Figure 1:
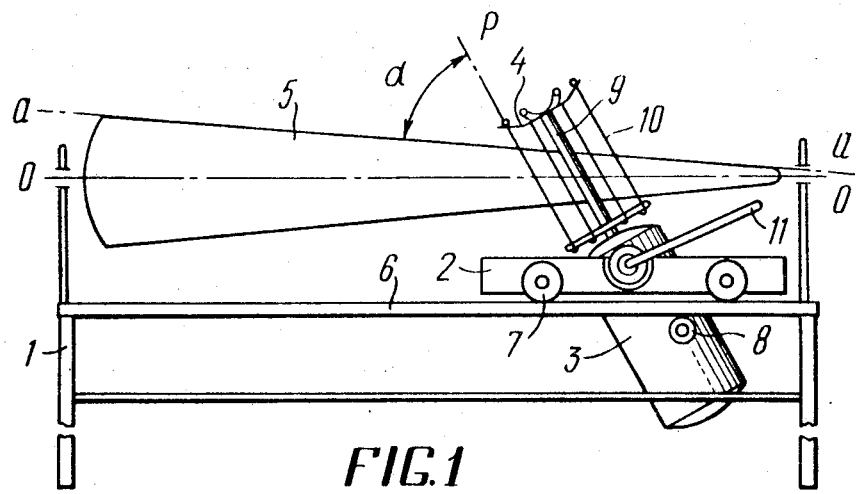
FIG. 1 is a diagrammatic view of the pelt fleshing machine according to the invention.

The pelt fleshing machine consists of a frame 1 (FIG.1), a carriage 2, an electric motor 3, a cutting tool 4 and a conical pelt holder 5.

The frame 1 has guides 6 for the movement of the carriage 2 which has wheels 7 rolling over the upper surface of the guides 6, and rolls 8, moving over the lower surface of said guides 6.

The conical holder 5 is mounted on the frame 1 in bearings and is capable of turning around its axis O — O.

The cutting tool 4 comprises a hollow spindle 9 slipped on the output shaft of the electric motor 3. The function of the defatting and demeating cutters is performed by strings 10 tensioned between two discs secured on the spindle 9.

Figure 2:
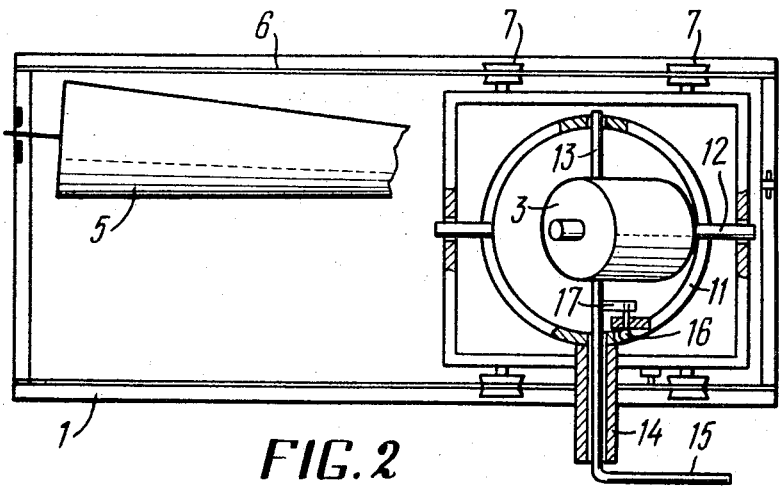
FIG. 2 — same, top view.

The electric motor 3 with the cutting tool 4 is mounted on the carriage 2 with a provision for turning relative to the holder 5, this turning being ensured by means of a ring 11 mounted on journals 12 (FIG.2) in the carriage 2. Mounted on journals 13 in this ring 11 is the electric motor 3 with the cutting tool 4 (not shown in the drawing). The ring 11 can be turned relative to the carriage 2 by a handle 14 fastened to the ring while the motor 3 with the cutting tool 4 can be turned relative to the ring 11 by a handle 15 fastened to the electric motor 3. The electric motor with the cutting tool are held inclined by a retainer 16 entering one of the holes of a sector 17 secured on the handle 15.

The device according to the invention operates as follows. The pelt is placed, flesh out, on the conical holder 5 (FIG.1) and is fastened on it by the tail and the hind legs. Then the electric motor 3 is started and the rotating cutting tool 4 together with the electric motor installed in an inclined position relative to the axis of the holder 5 and fixed in this position by the retainer 16 (FIG. 2) entering one of the holes in the sector 17, are brought close to the pelt by lifting the handle 14. When the string comes in contact with the pelt, an acute angle $\alpha$ is formed between the holder generatrix $a - a$ and the string 10; at this angle the component P of the cutting force directed tangentially to the holder generatrix $a - a$ rotates the holder. While the holder 5 rotates and the carriage moves along the holder, the strings 10 of the cutting tool 4 remove all fat and remaining meat from the pelt in one pass.

What is claimed is:

1. A pelt fleshing machine comprising: a frame means having supports and guides; an axially rotatable conical pelt holder installed in said supports of said frame; a carriage moving along said holder over said guides; a cutting tool means providing a cutting force having defatting and demeating cutters made in the form of tensioned strings; an electric motor having an output shaft providing means for rotating said cutting tool mounted on said output shaft; said motor with said cutting tool being installed in said carriage with means for turning said motor with said cutting tool relative to said holder to an inclined position so that said cutting tool forms such an acute angle between the generatrix, formed when said holder rotates, and one of said strings of said cutting tool contacting said pelt on said holder, so that the component of said cutting force directed tangentially to said holder generatrix causes said holder to rotate.

2. A machine according to claim 1 wherein said means for turning said electric motor with said cutting tool, comprises a ring mounted on first journal means provided in said carriage, said ring carrying said electric motor, said motor being mounted on second journal means provided in said ring and wherein said ring is fitted with retaining means for holding said turning means in said inclined position.

* * * * *